(12) United States Patent
Zeng

(10) Patent No.: US 9,199,643 B1
(45) Date of Patent: Dec. 1, 2015

(54) SENSOR ODOMETRY AND APPLICATION IN CRASH AVOIDANCE VEHICLE

(71) Applicant: GM GLOBAL TECHNOLOGY OPERATIONS LLC, Detroit, MI (US)

(72) Inventor: Shuqing Zeng, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/497,099

(22) Filed: Sep. 25, 2014

(51) Int. Cl.
*G06F 17/10* (2006.01)
*B60W 30/095* (2012.01)
(52) U.S. Cl.
CPC ....... *B60W 30/0953* (2013.01); *B60W 2420/52* (2013.01); *B60W 2550/10* (2013.01)
(58) Field of Classification Search
USPC .......................................................... 701/301
See application file for complete search history.

(56) References Cited

U.S. PATENT DOCUMENTS

| | | | |
|---|---|---|---|
| 2001/0020217 A1* | 9/2001 | Matsuno ..................... | 701/301 |
| 2004/0003350 A1* | 1/2004 | Simmons et al. ............ | 715/517 |
| 2009/0303276 A1* | 12/2009 | Van De Wynckel et al. ... | 347/19 |
| 2010/0001880 A1* | 1/2010 | Kraft et al. .................... | 340/905 |
| 2010/0017128 A1 | 1/2010 | Zeng | |
| 2010/0030474 A1* | 2/2010 | Sawada ........................ | 701/301 |
| 2010/0199283 A1* | 8/2010 | Kido et al. .................... | 718/103 |
| 2010/0305858 A1* | 12/2010 | Richardson ................... | 701/301 |
| 2011/0163904 A1* | 7/2011 | Alland et al. ................. | 342/1 |
| 2011/0169626 A1* | 7/2011 | Sun et al. ...................... | 340/439 |
| 2012/0035797 A1* | 2/2012 | Oobayashi et al. ............ | 701/23 |
| 2012/0310516 A1 | 12/2012 | Zeng | |

FOREIGN PATENT DOCUMENTS

EP 2 278 357 A2 1/2011

\* cited by examiner

*Primary Examiner* — Hussein A. Elchanti
(74) *Attorney, Agent, or Firm* — John A. Miller; Miller IP Group, PLC

(57) ABSTRACT

A method for determining an actual trajectory of a vehicle using object detection data and vehicle dynamics data. An object detection system identifies point objects and extended objects in proximity to the vehicle, where the point objects are less than a meter in length and width. An updated vehicle pose is calculated which optimally transposes the point objects in the scan data to a target list of previously-identified point objects. The updated vehicle pose is further refined by iteratively calculating a pose which optimally transposes the extended objects in the scan data to a target model of previously-identified extended objects, where the iteration is used to simultaneously determine a probability coefficient relating the scan data to the target model. The updated vehicle pose is used to identify the actual trajectory of the vehicle, which is compared to a planned path in a collision avoidance system.

20 Claims, 4 Drawing Sheets

SENSOR ODOMETRY AND APPLICATION IN CRASH AVOIDANCE VEHICLE

BACKGROUND OF THE INVENTION

1. Field of the Invention

This invention relates generally to enhanced trajectory tracking of an automobile and, more particularly, to a method for relative positioning of a host vehicle with respect to surrounding static obstacles and moving targets which uses object detection data along with vehicle dynamics data to compute a closed loop trajectory of the host vehicle, and uses the trajectory in path planning for collision avoidance or other purposes.

2. Discussion of the Related Art

Many vehicles now include systems which can actively control the path of the vehicle—for applications such as collision avoidance. These systems, when they detect a need to alter the path of the vehicle, will determine a desired new path for the vehicle to follow, implement braking and/or steering commands to achieve the desired path, monitor the actual trajectory of the vehicle relative to the desired path, and make further corrections to follow the desired path—all in real time.

In such systems, it is essential that a reliable method of monitoring the actual trajectory of the vehicle is available. Many vehicles equipped with such systems use vehicle dynamics sensors—including velocity, yaw rate and acceleration sensors—as one means of calculating actual vehicle trajectory. However, vehicle dynamics or "dead reckoning" calculations are susceptible to cumulative error. Therefore, another source of vehicle trajectory data is needed—preferably a source which does not accumulate error like the vehicle dynamics data. Global Positioning System (GPS) data is commonly used as the second source of vehicle trajectory data in vehicle path planning systems. However, some vehicles are not equipped with GPS receivers, and even vehicle which are equipped with GPS receivers will sometimes have no signal available—such as in tunnels, "urban tunnels" and roads with tall and dense surrounding tree cover.

SUMMARY OF THE INVENTION

In accordance with the teachings of the present invention, a method is disclosed for determining an actual trajectory of a vehicle using object detection data and vehicle dynamics data. An object detection system identifies point objects and extended objects in proximity to the vehicle, where the point objects are less than a meter in length and width. An updated vehicle pose is calculated which optimally transposes the point objects in the scan data to a target list of previously-identified point objects. The updated vehicle pose is further refined by iteratively calculating a pose which optimally transposes the extended objects in the scan data to a target model of previously-identified extended objects, where the iteration is used to simultaneously determine a probability coefficient relating the scan data to the target model. The updated vehicle pose is used to identify the actual trajectory of the vehicle, which is compared to a planned path in a collision avoidance system.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for determining an actual trajectory of a vehicle using object detection data and vehicle dynamics data is merely exemplary in nature, and is in no way intended to limit the invention or its applications or uses.

Some vehicles are now equipped with collision avoidance systems which can take control of vehicle steering and braking in situations where a vehicle collision appears to be imminent. Collision avoidance systems determine a desired path for the vehicle to take in order to avoid the collision, measure actual vehicle trajectory, and make steering/braking corrections in real time. Actual vehicle trajectory is typically determined in these systems using a combination of vehicle dynamics data and GPS data. However, in vehicles which are not equipped with a GPS receiver, and in situations where GPS data is not available due to sky visibility obstructions, another source of vehicle position data is needed.

Figure 1:
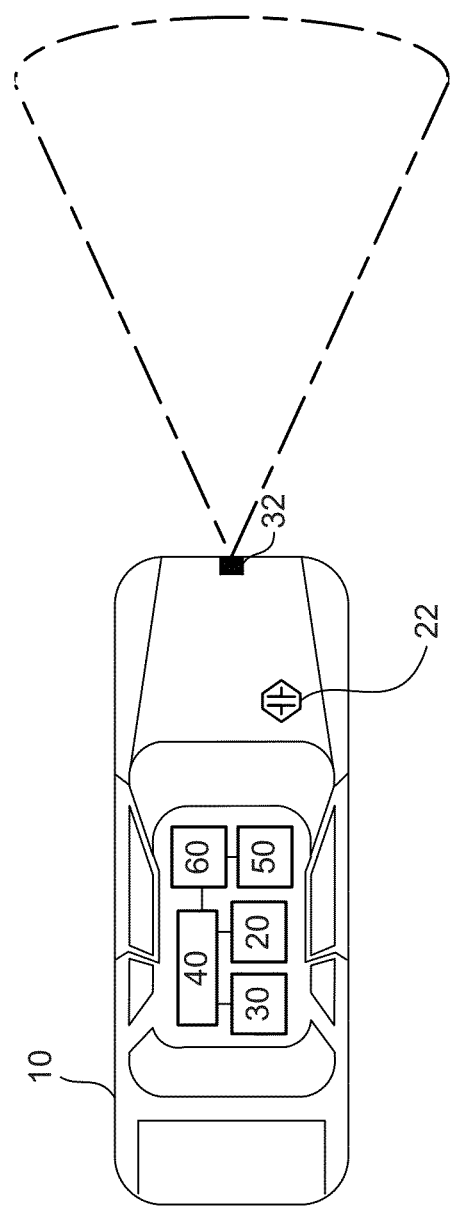
FIG. 1 is a schematic diagram of a vehicle with path planning and closed-loop trajectory control using vehicle dynamics and object detection data as input.

FIG. 1 is a schematic diagram of a vehicle 10 with path planning and closed-loop trajectory control using vehicle dynamics and object detection data as input. The vehicle 10 includes a vehicle dynamics module 20 which estimates vehicle motion based on vehicle dynamics calculations, using input from a plurality of sensors 22. The sensors 22 (one shown) may include a vehicle speed sensor, a yaw rate sensor, lateral and longitudinal acceleration sensors, and possibly others. The vehicle 10 also includes an object range data module 30, which provides object range data from one or more object detection sensor 32.

The object detection sensor 32 may use any suitable object detection technology, including short-range radar, long-range radar, LIDAR, and/or camera images. In particular, synthetic aperture radar systems are now becoming available where the radar antenna is a thin sheet which can be placed on or inside of a vehicle body panel or bumper fascia, thus making radar-based object detection more cost-effective. Using any desirable combination of object detection sensors 32, the object range data module 30 provides object range data which is updated at time intervals such as 100 milliseconds (ms). The vehicle 10 also includes a vehicle pose estimation module 40, a path planning module 50 and a vehicle control module 60, which are discussed further below.

Figure 2:
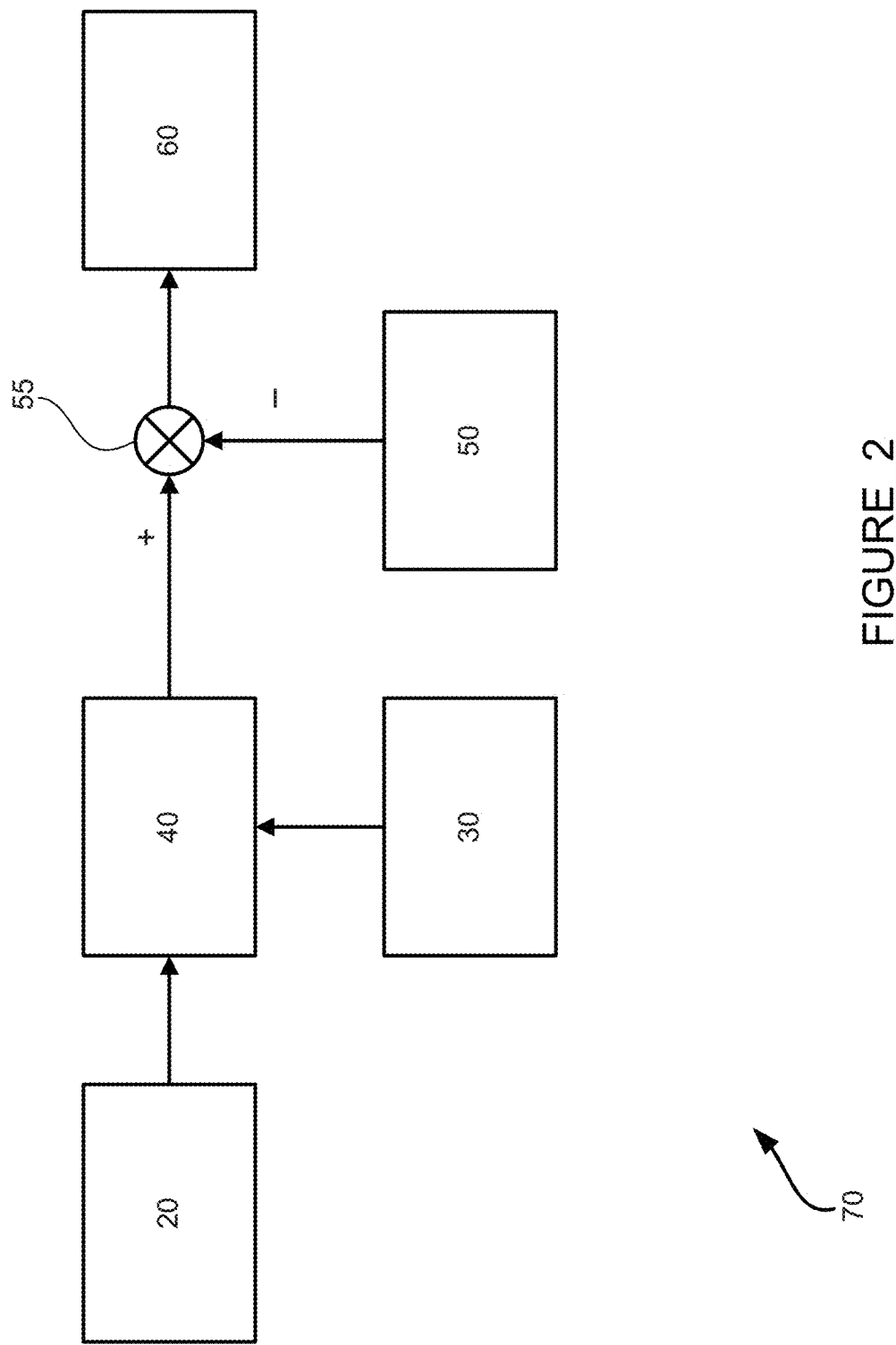
FIG. 2 is a block diagram of a vehicle path planning system with closed-loop trajectory control using vehicle dynamics and object detection data as input.

FIG. 2 is a block diagram of a vehicle path planning system 70 with closed-loop trajectory control using vehicle dynamics and object detection data as input. The path planning system 70 of FIG. 2 shows how the modules 20-60 are inter-related. As discussed above, the vehicle dynamics module 20 provides vehicle motion data to the vehicle pose estimation module 40, while the object range data module 30 provides object range data to the vehicle pose estimation module 40. The vehicle pose estimation module 40 uses the vehicle dynamics data and the object range data to estimate the updated vehicle pose, or position and orientation, at each time step. The path planning module 50 provides a desired path for the vehicle 10 to follow—such as for the purpose of collision avoidance. The actual vehicle trajectory data from the vehicle pose estimation module 40 and the desired vehicle path data from the path planning module 50 are provided to a summing junction 55, where the difference is provided to the vehicle control module 60 which makes further adjustments to steering and braking commands in order to minimize the difference between the actual vehicle trajectory and the desired vehicle path.

It is to be understood that the vehicle dynamics module 20, the object range data module 30, the vehicle pose estimation module 40, the path planning module 50 and the vehicle control module 60 are comprised of at least a processor and a memory module, where the processors are configured with software designed to compute desired and actual vehicle position and issue vehicle control commands based on the described inputs. The logic and calculations used in the vehicle pose estimation module 40, in particular, will be discussed in detail below.

It is to be further understood that the features and calculations of the vehicle pose estimation module 40, the path planning module 50 and the vehicle control module 60 could be allocated differently than described herein without departing from the spirit of the disclosed invention. For example, although the functions of the modules 40, 50 and 60 are described as being distinct throughout this disclosure, they could in fact all be programmed on the same processor. That is, all vehicle position planning, trajectory estimation and control functions could be performed in a single physical device with one or more processors.

Figure 3:
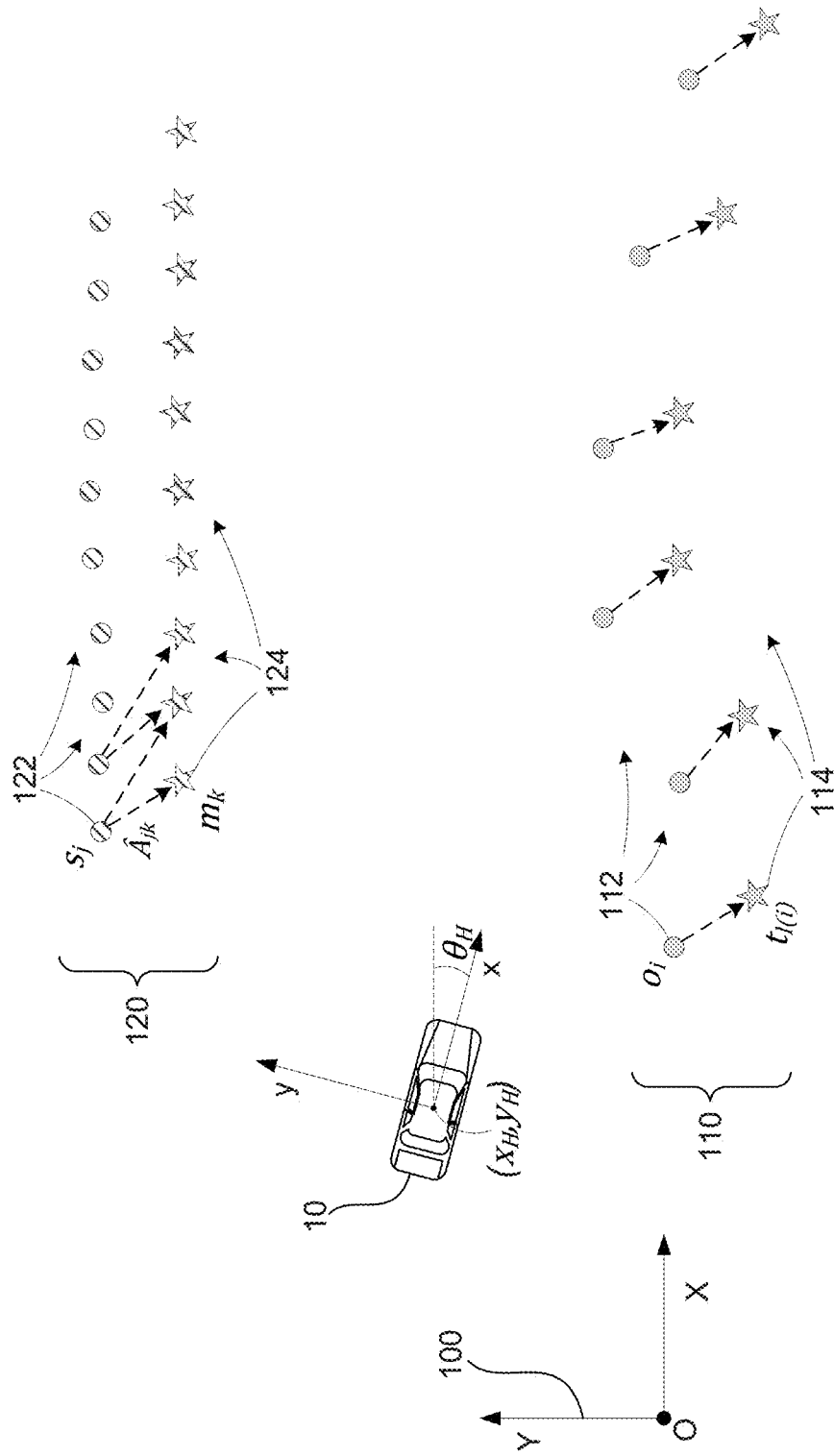
FIG. 3 is an illustration of a vehicle determining its position relative to detected objects, including point objects and extended objects.

FIG. 3 is an illustration of the vehicle 10 determining its position relative to detected objects, including point objects (such as light poles and tree trunks) and extended objects (such as vehicles and concrete barriers). A local world coordinate frame 100 is established with origin O and X-Y axes. The vehicle 10 is located at a position $(x_H, y_H)$ and has a heading angle of $\theta_H$ with respect to the local world coordinate frame 100. A method of continuously updating the vehicle pose (consisting of $x_H$, $y_H$ and $\theta_H$) based on the detected objects is detailed below.

The calculations described in the following discussion are performed in the vehicle pose estimation module 40 unless otherwise noted. At each time step, a scan map S is received from the object range data module 30, and S is projected to the local world coordinate frame 100 based on a known previous pose $P=(x_H, y_H, \theta_H)$. The scan map S is then grouped into a list of clusters, and each cluster is classified as a point object (which may be defined as those objects with length and width less than 1 meter) or an extended object (if larger). The objective of the method is to predict the new host vehicle pose from the observed relative motion of the scan objects.

A predicted new vehicle pose $P'=(x'_H, y'_H, \theta'_H)$ can be computed based on vehicle dynamics and the previous pose P, as follows:

$$x'_H = x_H + v_{xH} \Delta T$$

$$y'_H = y_H + v_{yH} \Delta T$$

$$\theta'_H = \theta_H + \omega_H \Delta T \quad (1)$$

Where $v_{xH}$ is the vehicle longitudinal velocity, $v_{yH}$ is the vehicle lateral velocity, $\omega_H$ is the vehicle yaw rate and $\Delta T$ is the time step increment. Throughout the following discussion, it is important to distinguish between P', which is the preliminary predicted new vehicle pose based on vehicle dynamics, and other variables such as P* and P''', which are new vehicle poses produced by the calculations based on the object scan data.

A first estimation of the new vehicle pose, producing a value P*, will be made based on the point objects, which are indicated by bracket 110 in FIG. 3. For each point object in the scan data (represented by circles 112), a center of mass $o_i = (x_i, y_i)$ is computed, and the point object is matched with a current registered target (represented by stars 114) in a point target list $\{t_l\}$, where each target in $\{t_l\}$ is represented by its position $(x_l, y_l)$. The new pose P* can be found by using a least-squares optimization, as follows:

$$P^* = \mathrm{argmin}_{P'} \sum_i \left\| \frac{o_i - T_{P'}(t_{l(i)})}{\sigma_{l(i)}} \right\|^2 \quad (2)$$

Where $t_{l(i)}$ is the corresponding registered target associated with the point object $o_i$, $T_{P'}(t_{l(i)})$ is the projection of $t_{l(i)}$ under rigid transformation P' determined by the vehicle position, and $\sigma_{l(i)}$ is the measurement error covariance for the corresponding target $t_{l(i)}$.

A hit count $k_l$ is tracked for each registered target $t_l$. The hit count $k_l$ is incremented by one for each registered target $t_l$ which is matched by a point object $o_i$ from the scan data. If $k_l$ is greater than a predetermined threshold, such as four, then the target $t_l$ is marked as being matured. If $o_i$ does not match with any registered target $t_l$ in the map, a new target will be generated with $k_l=1$.

The point target list $\{t_l\}$ can be updated using simultaneous localization and mapping techniques, as follows:

$$t'_l = \frac{1}{\kappa_l} T_{P^*}^{-1}(o_i) + \frac{\kappa_l - 1}{\kappa_l} t_l \quad (3)$$

Where $t'_l$ is the new target location (x,y), $T_{P^*}^{-1}$ is the inverse transformation of P*, and $o_i$ is the point object from the current scan which matches the registered target $t_l$. The measurement error covariance for the corresponding target $t_l$ is updated as:

$$\sigma_l^{2'} = \frac{1}{\kappa_l} (t_l - T_{P^*}^{-1}(o_i))^2 + \frac{\kappa_l - 1}{\kappa_l} \sigma_l^2 \quad (4)$$

Where $o_i$ is the point object associated with $t_l$. Also, as mentioned above, the hit count $k_l$ is updated by incrementing $k_l = k_l + 1$.

The new vehicle pose P* from Equation (2) is the output from the analysis of point objects described above.

A second estimation of the new vehicle pose can then be performed based on the extended objects, which are indicated by bracket 120 in FIG. 3. The objective of the extended object calculation is to find the best transformation from an existing model M of extended targets (point clouds) to a current scan S of objects (concatenated clusters). The extended object calculation is iterative in nature because of the ambiguity in associating individual scan points $s_j$ in S (represented by circles 122) to model points $m_k$ in M (represented by stars 124).

The iteration is started by assuming an initial value of a pose $P^{(0)}$ is equal to the new vehicle pose P* from Equation (2) of the analysis of point objects. If no point objects are available in the scan data, then $P^{(0)}$ can be set equal to P' from the vehicle dynamics data. The extended object vehicle pose calculation is then iteratively computed until convergence, as follows:

$$P^{(n+1)} = \operatorname{argmin}_{p(n)} \sum_{j,k} \hat{A}_{jk} \left\| \frac{s_j - T_{p(n)}(m_k)}{\sigma} \right\|^2 \quad (5)$$

Where $P^{(n+1)}$ is the next iterative value of the vehicle pose, $s_j$ and $m_k$ are extended object scan points and model points, respectively, $T_P(x)$ is the operator to apply a rigid transformation P to a point x, and the coefficient matrix $\hat{A}_{jk}$, computed by an Expectation-Maximization (EM) algorithm, is the probability that $s_j$ is a measurement of $m_k$, and $\Sigma_k \hat{A}_{jk}=1$.

In Equation (5), $\sigma$ is a bandwidth parameter, which is a predefined positive constant. An implementation of $\hat{A}_{jk}$ can be:

$$\hat{A}_{jk} = c \exp\left(-\left\|\frac{s_j - m_k}{\sigma}\right\|^2\right) \quad (6)$$

Where c is the normalizing factor. After convergence or a certain prescribed number of iterations, an extended object-based transformation P'' is defined as $P''=P^{(n+1)}$ from Equation (5).

If a model point $m_k$ is measured by a scan point (e.g., $s_j$), the hit count for $m_k$ is increased by one. When a scan point $s_j$ does not match with any model point, the scan point $s_j$ is added to the model M and its hit count is set equal to one. When a model point $m_k$ is not matched by any scan point in S, its hit count is decreased by one. Model points with hit count less than one are periodically deleted.

The extended object target model M can be modeled as a Gaussian Mixture Model (GMM) distribution:

$$p(x;M) = \Sigma_{k=1}^{n_M} p(x|m_k) \quad (7)$$

where $$p(x|m_k) = \frac{1}{(2\pi\sigma^2)^{\frac{3}{2}}} \exp\left(-\frac{\|x-m_k\|^2}{2\sigma^2}\right) \quad (8)$$

And $x \in R^2$, a point in 2-D Cartesian coordinate frame.

In the above equations, the parameter $m_k$ has a normal distribution, $$p(m_k) = N\left(v_k, \frac{\sigma^2}{\eta_k}\right) \quad (9)$$

Where $v_k$ is the mean, $$\frac{\sigma^2}{\eta_k}$$

is the variance, and $v_k$ and $\eta_k$ are parameters of the model M. The update rules for $v_k$ and $\eta_k$ are:

$$v'_k = \frac{\rho_k \bar{s}_k + \eta_k T_{P''}(v_k)}{\rho_k + \eta_k} \quad (10)$$

and $$\eta'_k = \eta_k + \rho_k \quad (11)$$

Where $\rho_k = \Sigma_j \hat{A}_{jk}$, and $\bar{s}_k = \Sigma_j \hat{A}_{jk} s_j / \rho_k$.

To summarize the above discussion, a vehicle pose P* is computed from vehicle dynamics data and point objects in the scan data, and a vehicle pose P'' is computed from the vehicle pose P* and extended objects in the scan data. Different algorithms can be employed for using either the vehicle pose P* or the vehicle pose P'', or a combination of the two. For example, if point objects are dominant in the scan data, then the vehicle pose P* could be used as the updated vehicle position for trajectory tracking purposes. Conversely, if extended objects are dominant in the scan data, then the vehicle pose P'' could be used as the updated vehicle position for trajectory tracking purposes. As another alternative, a fusion calculation could be performed using both point and extended objects, as follows:

$$P^{**} = \operatorname{argmin}_{p(n)} \left( \sum_i \left\| \frac{o_i - T_{p(n)}(t_{l(i)})}{\sigma_{l(i)}} \right\|^2 + \sum_{j,k} \hat{A}_{jk} \left\| \frac{s_j - T_{p(n)}(m_k)}{\sigma} \right\|^2 \right) \quad (12)$$

Where the first summation is for the point-based objects as shown in Equation (2) and the second summation is for the extended objects as shown in Equation (5). Equation (12) is solved iteratively because of the ambiguity in associating the extended object scan points $s_j$ to model points $m_k$, as discussed previously. After convergence or a certain prescribed number of iterations, an overall, fused, scanned-object-based transformation P** is yielded by Equation (12).

Figure 4:
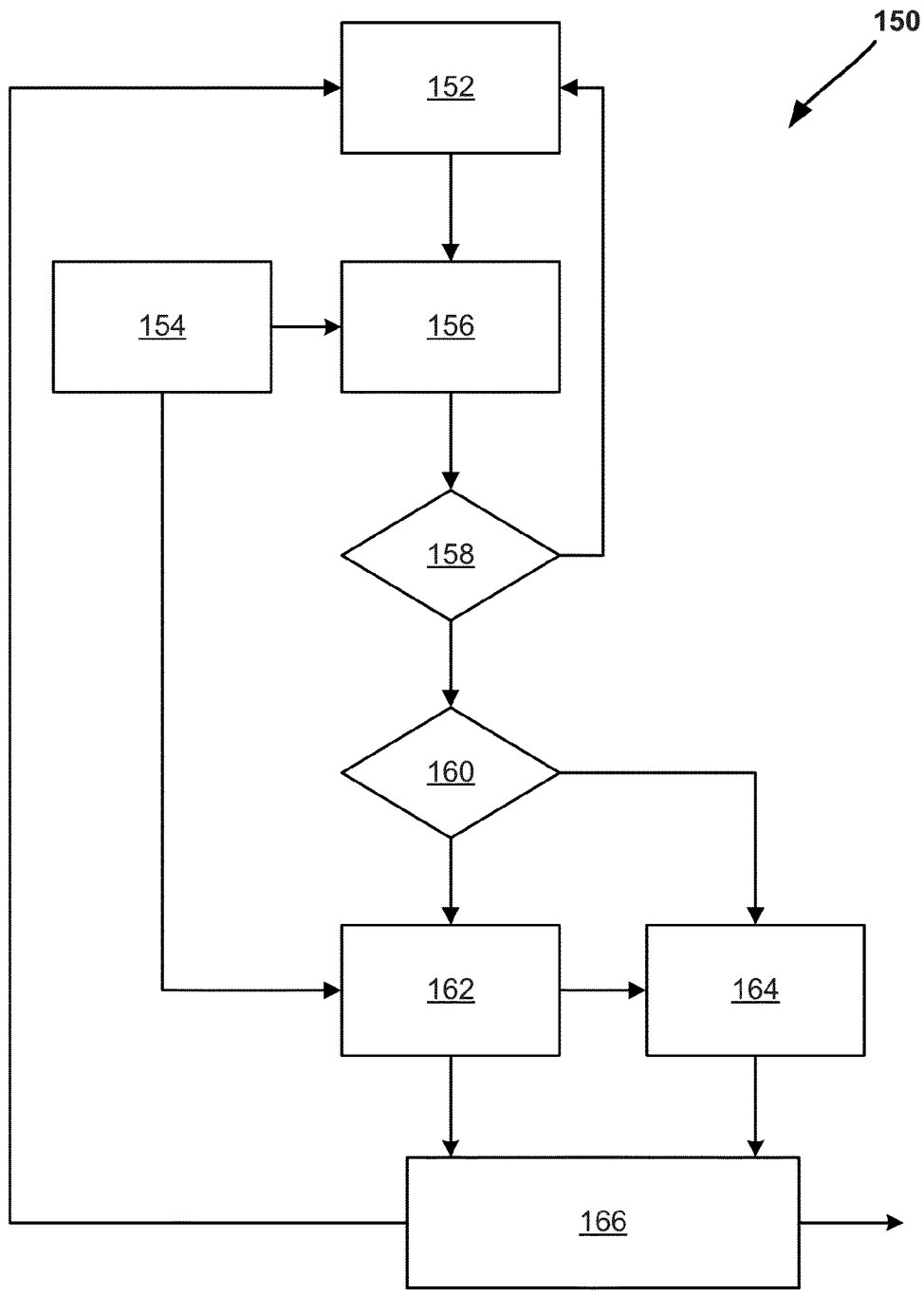
FIG. 4 is a flowchart diagram of a method for vehicle path planning and trajectory following with closed-loop control, using vehicle dynamics and object detection data as input.

FIG. 4 is a flowchart diagram 150 of a method for vehicle path planning and trajectory following with closed-loop control, using vehicle dynamics and object detection data as input. As described previously, the method of the flowchart diagram 150 is performed by algorithms in the vehicle pose estimation module 40. At box 152, new scan data is obtained from the object range data module 30. At box 154, host vehicle motion data is provided by the vehicle dynamics module 20. Using the host vehicle motion data and the object scan data, the ground speed of scanned targets can be estimated at box 156. At decision diamond 158, it can be determined if moving objects are present in the scan data. If it is determined that only moving objects are present in the scan data, then the process loops back to the box 152 to receive the next time increment of scan data, as moving objects may not be useful for the trajectory tracking purposes discussed above. If moving and stationary objects are identified, the moving objects may be disregarded.

At decision diamond 160, it is determined whether point objects, extended objects, or both are present in the scan data. At box 162, point objects in the scan data are used to calculate the new vehicle pose P* using Equation (2). The point object calculations at the box 162 also use the vehicle dynamics data from the box 154, as discussed in detail previously. At box 164, extended objects in the scan data are used to calculate the new vehicle pose P'' using Equation (5). The extended object calculations at the box 164 also use the point-object-based pose estimation P* from the box 162, as discussed in detail previously.

At box 166, an overall vehicle pose estimation is determined from the scanned object data, using the pose estimations from the boxes 162 and 164 as input. As discussed above, the overall vehicle pose estimation may simply use the value calculated at the box 162 or 164 if point objects or extended objects are dominant in the scan data. Alternatively, a fusion calculation can be performed at the box 166, using Equation (12). The overall vehicle pose estimation is output from the box 166, where it is used by the vehicle control module 60 for vehicle trajectory control. The process then loops back to the box 152 to receive the next time increment of scan data.

Using the methods disclosed herein, closed-loop vehicle trajectory control can be implemented using object scan data as input. By eliminating the need for GPS data for vehicle trajectory tracking feedback, system cost can be reduced, and the issue of temporary unavailability of GPS signals is avoided. Furthermore, the ability to process both point objects and extended objects provides a robust solution, while still being implementable in real-time processors onboard the vehicle.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for estimating a vehicle pose based on object scan data, said method comprising:
   obtaining scan data for objects in proximity to a host vehicle;
   providing host vehicle motion data from a vehicle dynamics system onboard the host vehicle;
   identifying point objects and extended objects in the scan data, where the point objects have a length and a width less than a predetermined threshold and the extended objects have a length or a width equaling or exceeding the threshold;
   computing, using a microprocessor, a first estimate of the vehicle pose based on the host vehicle motion data and the point objects identified in the scan data;
   computing, using the microprocessor, a second estimate of the vehicle pose based on the first estimate of the vehicle pose and the extended objects identified in the scan data; and
   determining an overall estimate of the vehicle pose based on the first estimate of the vehicle pose and the second estimate of the vehicle pose.

2. The method of claim 1 wherein the vehicle pose includes a two-dimensional position relative to a local world coordinate frame on a roadway, and a heading angle relative to the local world coordinate frame.

3. The method of claim 1 wherein obtaining scan data includes obtaining scan data from a synthetic aperture radar object detection system.

4. The method of claim 1 wherein computing a first estimate of the vehicle pose includes comparing the point objects in the scan data to a target list of previously-identified point objects, and using a least-squares calculation to find a transposition of the previously-identified point objects which minimizes the difference between the point objects in the scan data and the previously-identified point objects.

5. The method of claim 4 wherein the target list of previously-identified point objects is updated by incrementing a hit count and transposing a position of point objects in the target list for which there is a match in the scan data.

6. The method of claim 1 wherein computing a second estimate of the vehicle pose includes comparing the extended objects in the scan data to a target model of previously-identified extended objects, and using an iterative least-squares calculation to simultaneously find a probability coefficient and a transposition of the previously-identified extended objects which minimizes the difference between the extended objects in the scan data and the previously-identified extended objects, where the probability coefficient represents a probability that a particular one of the extended objects in the scan data matches a particular one of the previously-identified extended objects.

7. The method of claim 6 wherein target model of previously-identified extended objects is modeled as a Gaussian Mixture Model distribution, and the target model is updated by incrementing a hit count and transposing a position of extended objects in the target model for which there is a match in the scan data.

8. The method of claim 1 wherein determining an overall estimate of the vehicle pose includes using the first estimate of the vehicle pose as the overall estimate if the scan data includes predominantly point objects, and using the second estimate of the vehicle pose as the overall estimate if the scan data includes predominantly extended objects.

9. The method of claim 1 wherein determining an overall estimate of the vehicle pose includes performing a fusion calculation which simultaneously optimizes the first estimate of the vehicle pose and the second estimate of the vehicle pose.

10. The method of claim 1 further comprising using the overall estimate of the vehicle pose for determining an actual vehicle trajectory in a collision avoidance system on the vehicle.

11. A method for vehicle path planning and trajectory following with closed-loop control, using vehicle dynamics and object detection data, said method comprising:
    obtaining scan data for objects in proximity to a host vehicle;
    providing host vehicle motion data from a vehicle dynamics system onboard the host vehicle;
    disregarding moving objects in the scan data, where the moving objects are determined by comparison to the host vehicle motion data;
    identifying point objects and extended objects in the scan data, where the point objects have a length and a width less than a predetermined threshold and the extended objects have a length or a width equaling or exceeding the threshold;
    computing, using a microprocessor, a first estimate of the vehicle pose based on the host vehicle motion data and the point objects identified in the scan data, where the vehicle pose includes a two-dimensional position relative to a local world coordinate frame on a roadway, and a heading angle relative to the local world coordinate frame;
    computing, using the microprocessor, a second estimate of the vehicle pose based on the first estimate of the vehicle pose and the extended objects identified in the scan data;
    determining an overall estimate of the vehicle pose based on the first estimate of the vehicle pose and the second estimate of the vehicle pose; and
    using the overall estimate of the vehicle pose to determine an actual trajectory being followed by the vehicle, where the actual trajectory and a planned path are incorporated in a collision avoidance system on the vehicle.

12. The method of claim 11 wherein computing a first estimate of the vehicle pose includes comparing the point objects in the scan data to a target list of previously-identified point objects, and using a least-squares calculation to find a transposition of the previously-identified point objects which minimizes the difference between the point objects in the scan data and the previously-identified point objects, and wherein computing a second estimate of the vehicle pose includes comparing the extended objects in the scan data to a target model of previously-identified extended objects, and using an iterative least-squares calculation to simultaneously find a probability coefficient and a transposition of the previously-identified extended objects which minimizes the difference between the extended objects in the scan data and the previously-identified extended objects, where the probability coefficient represents a probability that a particular one of the extended objects in the scan data matches a particular one of the previously-identified extended objects.

13. The method of claim 12 wherein determining an overall estimate of the vehicle pose includes performing a fusion calculation which simultaneously optimizes the first estimate of the vehicle pose and the second estimate of the vehicle pose.

14. A vehicle pose estimation system, said system comprising:
    an object detection module, said object detection module obtaining scan data for objects in proximity to a host vehicle;
    a vehicle dynamics module, said vehicle dynamics module providing host vehicle motion data including longitudinal and lateral velocity, longitudinal and lateral acceleration, and yaw rate; and
    a vehicle pose estimation module in communication with the object detection module and the vehicle dynamics module, said vehicle pose estimation comprising a memory module and a processor configured to:
    identify point objects and extended objects in the scan data, where the point objects have a length and a width less than a predetermined threshold and the extended objects have a length or a width equaling or exceeding the threshold;
    compute a first estimate of the vehicle pose based on the host vehicle motion data and the point objects identified in the scan data, where the vehicle pose includes a two-dimensional position relative to a local world coordinate frame on a roadway, and a heading angle relative to the local world coordinate frame;
    compute a second estimate of the vehicle pose based on the first estimate of the vehicle pose and the extended objects identified in the scan data; and
    determine an overall estimate of the vehicle pose based on the first estimate of the vehicle pose and the second estimate of the vehicle pose.

15. The system of claim 14 wherein the vehicle pose estimation module computes a first estimate of the vehicle pose by comparing the point objects in the scan data to a target list of previously-identified point objects, and using a least-squares calculation to find a transposition of the previously-identified point objects which minimizes the difference between the point objects in the scan data and the previously-identified point objects.

16. The system of claim 15 wherein the target list of previously-identified point objects is updated by incrementing a hit count and transposing a position of point objects in the target list for which there is a match in the scan data.

17. The system of claim 14 wherein the vehicle pose estimation module computes a second estimate of the vehicle pose by comparing the extended objects in the scan data to a target model of previously-identified extended objects, and using an iterative least-squares calculation to simultaneously find a probability coefficient and a transposition of the previously-identified extended objects which minimizes the difference between the extended objects in the scan data and the previously-identified extended objects, where the probability coefficient represents a probability that a particular one of the extended objects in the scan data matches a particular one of the previously-identified extended objects.

18. The system of claim 17 wherein target model of previously-identified extended objects is modeled as a Gaussian Mixture Model distribution, and the target model is updated by incrementing a hit count and transposing a position of extended objects in the target model for which there is a match in the scan data.

19. The system of claim 14 wherein the vehicle pose estimation module determines an overall estimate of the vehicle pose by using the first estimate of the vehicle pose as the overall estimate if the scan data includes predominantly point objects, and using the second estimate of the vehicle pose as the overall estimate if the scan data includes predominantly extended objects.

20. The system of claim 14 wherein the vehicle pose estimation module determines an overall estimate of the vehicle pose by performing a fusion calculation which simultaneously optimizes the first estimate of the vehicle pose and the second estimate of the vehicle pose.

* * * * *